United States Patent
Chida et al.

(10) Patent No.: US 9,486,011 B2
(45) Date of Patent: Nov. 8, 2016

(54) CIGARETTE MAINSTREAM SMOKE COMPONENT ADSORBENT AND CIGARETTE FILTER

(71) Applicant: Japan Tobacco Inc., Tokyo (JP)

(72) Inventors: Masahiro Chida, Tokyo (JP); Yasuhiro Nakagawa, Tokyo (JP); Katsuhito Misawa, Tokyo (JP); Yayoi Kasakura, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 0 days.

(21) Appl. No.: 14/249,058

(22) Filed: Apr. 9, 2014

(65) Prior Publication Data

US 2014/0216486 A1 Aug. 7, 2014

Related U.S. Application Data

(60) Division of application No. 12/870,929, filed on Aug. 30, 2010, now abandoned, which is a continuation of application No. PCT/JP2009/054472, filed on Mar. 9, 2009.

(30) Foreign Application Priority Data

Mar. 18, 2008 (JP) ................................. 2008-070126

(51) Int. Cl.
*A24D 3/08* (2006.01)
*A24D 3/14* (2006.01)
*A24D 3/16* (2006.01)
*B01J 20/20* (2006.01)
(Continued)

(52) U.S. Cl.
CPC . *A24D 3/08* (2013.01); *A24D 3/14* (2013.01); *A24D 3/163* (2013.01); *B01J 20/20* (2013.01); *B01J 20/28064* (2013.01); *B01J 20/28066* (2013.01); *B01J 20/3204* (2013.01); *B01J 20/3274* (2013.01)

(58) Field of Classification Search
CPC ........... A24D 3/08; A24D 3/14; A24D 3/163
See application file for complete search history.

(56) References Cited

U.S. PATENT DOCUMENTS

| 4,018,233 | A | 4/1977 | Miyake |
| 5,043,310 | A | 8/1991 | Takeuchi et al. |
| 6,499,490 | B1 * | 12/2002 | Saito et al. ................... 131/369 |

(Continued)

FOREIGN PATENT DOCUMENTS

| CN | 101094598 A | 12/2007 |
| EP | 0 379 378 A1 | 7/1990 |

(Continued)

OTHER PUBLICATIONS

T.D. Leathers, "Biotechnological Production and Applications of Pullulan," Jun. 27, 2003, Appl Micrbiol Biotechno., vol. 62, pp. 468-473.

*Primary Examiner* — Michael H Wilson
*Assistant Examiner* — Dionne Walls Mayes
(74) *Attorney, Agent, or Firm* — Birch, Stewart, Kolasch & Birch, LLP

(57) ABSTRACT

The present invention provides a cigarette mainstream smoke component adsorbent including particulate activated carbon, and a glucan film supported by the particulate activated carbon. Also, the present invention provides a cigarette filter including the cigarette mainstream smoke component adsorbent.

8 Claims, 2 Drawing Sheets

(51) Int. Cl.
     *B01J 20/28*  (2006.01)
     *B01J 20/32*  (2006.01)

(56) References Cited

U.S. PATENT DOCUMENTS

| | | |
|---|---|---|
| 7,381,277 B2 | 6/2008 | Gonterman et al. |
| 2006/0008646 A1 | 1/2006 | Haggquist |
| 2006/0021624 A1 | 2/2006 | Gonterman et al. |
| 2006/0144410 A1 | 7/2006 | Luan et al. |
| 2006/0264130 A1 | 11/2006 | Karles et al. |
| 2008/0053467 A1 | 3/2008 | Taniguchi et al. |
| 2008/0087290 A1 | 4/2008 | Taniguchi et al. |
| 2008/0110470 A1 | 5/2008 | Zhuang et al. |
| 2009/0253754 A1 | 10/2009 | Seimin et al. |

FOREIGN PATENT DOCUMENTS

| | | |
|---|---|---|
| EP | 1 839 507 A1 | 10/2007 |
| EP | 2 093 276 A1 | 8/2009 |
| JP | 51-21595 | 2/1976 |
| JP | 53-133697 | 11/1978 |
| JP | 55-42210 A | 3/1980 |
| JP | 58-84040 A | 5/1983 |
| JP | 2-277545 A | 11/1990 |
| JP | 3-229605 A | 10/1991 |
| JP | 9-28366 A | 2/1997 |
| JP | 2005-263610 A | 9/2005 |
| JP | 3744953 B2 | 12/2005 |
| JP | 2007-125 A | 1/2007 |
| JP | 2008-254959 A | 10/2008 |
| WO | WO 03/101421 A1 | 12/2003 |
| WO | WO 2006/070662 A1 | 7/2006 |
| WO | WO 2006/082525 A1 | 8/2006 |
| WO | WO 2006/082748 A1 | 1/2007 |
| WO | WO 2007/010407 A2 | 1/2007 |
| WO | WO 2007/114898 A1 | 10/2007 |
| WO | WO 2008/072627 A1 | 6/2008 |

* cited by examiner

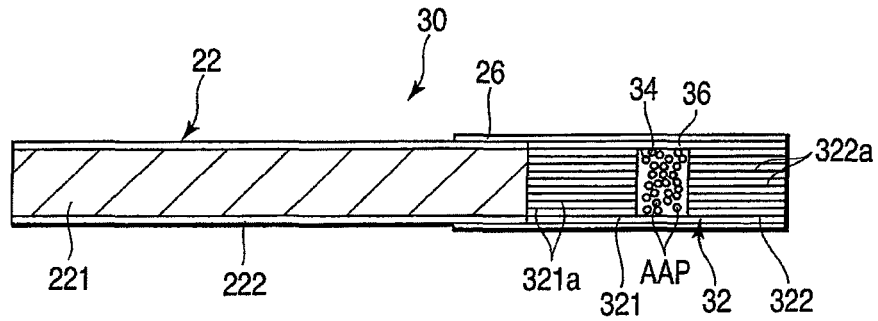
F I G. 4
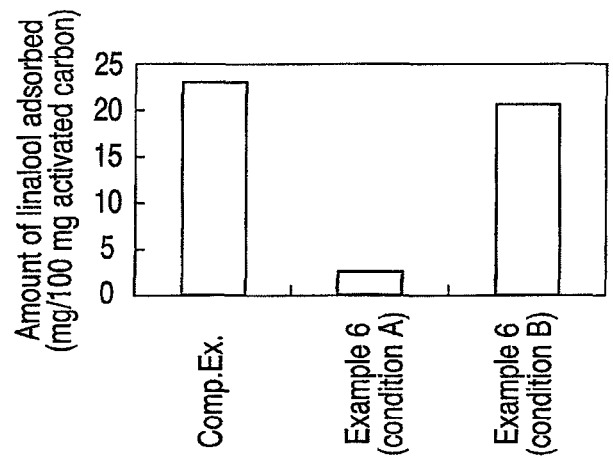
F I G. 5
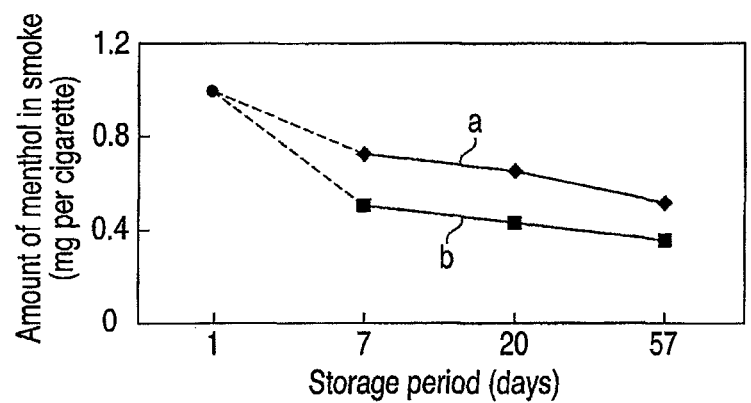
F I G. 6

CIGARETTE MAINSTREAM SMOKE COMPONENT ADSORBENT AND CIGARETTE FILTER

CROSS REFERENCE TO RELATED APPLICATIONS

This is a Divisional Application of U.S. application Ser. No. 12/870,929 filed Aug. 30, 2010 which was a Continuation Application of PCT Application No. PCT/JP2009/054472, filed Mar. 9, 2009, and which was based upon and claims the benefit of priority from prior Japanese Patent Application No. 2008-070126, filed Mar. 18, 2008. The entire contents of each of these applications are incorporated herein by reference.

BACKGROUND OF THE INVENTION

1. Field of the Invention

The present invention relates to a cigarette mainstream smoke component adsorbent and a cigarette filter comprising the same.

2. Description of the Related Art

A flavorant is added to leaf tobacco shreds used in a cigarette in order to adjust the flavor and the taste. The flavorant includes a primary flavorant as a casing source and a secondary flavorant as a top flavor. The components of the secondary flavorant exhibit relatively high volatility and are likely to be decomposed by heat. Accordingly, when the cigarette containing the secondary flavorant is smoked, the smoker would taste the flavor to a lesser extent because of the volatilization of the secondary flavorant during the storage thereof. In addition, with respect to the cigarette provided with a charcoal (activated carbon) filter which adsorbs cigarette mainstream smoke components, the secondary flavorant migrates to and is adsorbed on the charcoal, resulting in a partial deterioration of the flavor and taste. The charcoal having the secondary flavorant adsorbed thereon suffers a decreased capability of removing tobacco mainstream smoke components.

The specification of Japanese Patent No. 3744953 discloses a tobacco filter incorporating capsules containing a deodorant, such as activated carbon. These capsules are destroyed by external force when stubbing out the cigarette to thereby release the deodorant within the filter, thus eliminating the smoke odor. However, because in this tobacco filter the deodorant is encapsulated in the capsules and the capsules are destroyed by external force when stubbing out the cigarette after smoking to thereby release the deodorant within the filter, the deodorant cannot exert its function during smoking the cigarette.

BRIEF SUMMARY OF THE INVENTION

It is an object of the present invention to provide an adsorbent and a cigarette filter capable of suppressing the adsorption of a flavorant during non-smoking and capable of adsorbing cigarette mainstream smoke components during smoking.

According to one aspect of the present invention, there is provided a cigarette mainstream smoke component adsorbent characterized by comprising particulate activated carbon and a glucan film supported by the particulate activated carbon.

According to another aspect of the present invention, there is provided a cigarette filter comprising a cigarette mainstream smoke component adsorbent according to the present invention.

BRIEF DESCRIPTION OF THE SEVERAL VIEWS OF THE DRAWING

FIG. 4 is a schematic longitudinal sectional view of a cigarette with a filter according to another embodiment of the present invention.

FIG. 5 is a graph showing the flavorant adsorbing performance of an adsorbent according to the present invention, together with that of a comparative example.

FIG. 6 is a graph showing the flavorant adsorbing performance after storage of a cigarette with a filter containing an adsorbent according to the present invention, together with that of a comparative example.

DETAILED DESCRIPTION OF THE INVENTION

The present invention will be described in greater detail below with appropriate reference to the appended drawings. Like elements are identified by like numerals throughout all the drawings, and repetition of detailed descriptions will be avoided.

A cigarette mainstream smoke component adsorbent according to the present invention comprises particulate activated carbon and a glucan film supported by the particulate activated carbon.

The origin of the activated carbon for use in the present invention is not particularly limited. Use may be made of a spherical or powdery activated carbon with fine pores (diameter 10 to 200 Å) obtained by reacting a natural material, such as coal or palm husk, as a raw material with a gas or chemical at a high temperature. Activated carbon particles whose average particle diameter is 75 to 1000 µm can be suitably employed. The specific surface area of the activated carbon as measured in accordance with the BET method is preferably 800 to 2000 $m^2/g$, more preferably 1000 to 1200 $m^2/g$.

The glucan film is formed of, for example, pullulan, maltodextrin, hydroxypropylcellulose or the like and is water-soluble. In order to soften the glucan film, a protein such as gelatin, a gummy saccharide such as carrageenan, gellan gum, locast bean gum or gum arabic, a monosaccharide, a sugar alcohol, a cellulose derivative or a polyol such as glycerol or polyethylene glycol can be contained in the glucan film. Such a film softening agent can be used in an amount of 0.1 to 3% based on the weight of glucan. Further, the glucan film may contain a colorant other than black colorants in order to conceal the blackness of the activated carbon and improve the appearance of the adsorbent. Examples of such colorants are a water-soluble pigment such as an annatto pigment, calcium carbonate and the like. The colorant is used in an amount sufficient to cause the glucan to have the same color as that of the colorant. For example, the colorant can be used in an amount of 0.1 to 1% based on the weight of the glucan.

In one embodiment, the cigarette mainstream smoke component adsorbent according to the present invention is free of flavorants (for example, neither the activated carbon particles nor the glucan film contains any flavorant).

Figure 1:
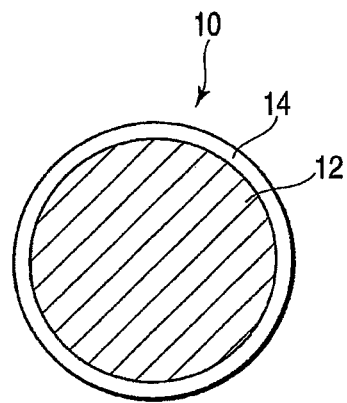
FIG. 1 is an enlarged schematic cross-sectional view of a cigarette mainstream smoke component adsorbent according to one embodiment of the present invention.

FIG. 1 is an enlarged schematic cross-sectional view of a cigarette mainstream smoke component adsorbent 10 according to one embodiment of the present invention. In this adsorbent 10, a glucan film (for example, a pullulan film) 14 directly covers the entire surface of an activated carbon particle (carrier) 12.

The thickness of the glucan film 14 is not particularly limited. However, from the viewpoint of the disruption of the glucan film during smoking, it is preferred to form the glucan film 14 using glucan in an amount corresponding to 0.1 to 10% of the weight of the finished adsorbent.

The adsorbent of the type shown in FIG. 1 can be formed from, for example, an aqueous solution or aqueous dispersion of glucan optionally containing the film softening agent and/or colorant. For example, activated carbon particles are placed in a fluidized-bed granulating drier, in which while blowing thereinto a hot air heated at, for example, 80° C. or below, an aqueous solution or aqueous dispersion of glucan optionally containing the film softening agent and/or colorant is continuously or intermittently sprayed onto the surfaces of the activated carbon particles and dried. Depending on the composition of the aqueous solution or aqueous dispersion of glucan, the drying is immediately followed by cooling. Thus, the glucan film is formed on the surface of each of the activated carbon particles.

Figure 2:
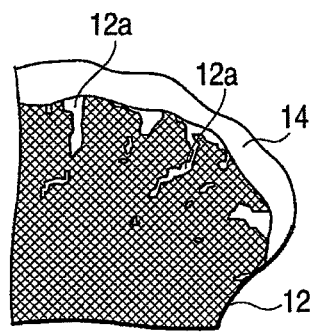
FIG. 2 is an enlarged schematic cross-sectional view of part of a cigarette mainstream smoke component adsorbent according to one embodiment of the present invention.

The glucan film 14 does not infiltrate into the secondary or tertiary pores of the activated carbon particle 12 to plug them up. This aspect is illustrated in FIG. 2. As illustrated in FIG. 2, the glucan film 14 covers the entire surface of the activated carbon 12 but does not infiltrate into the secondary or tertiary pores 12a thereof.

A cigarette filter according to the present invention comprises a cigarette mainstream smoke component adsorbent according to the present invention.

Figure 3:
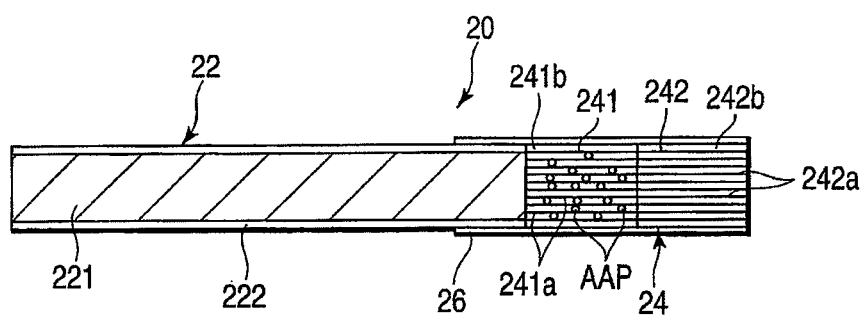
FIG. 3 is a schematic longitudinal sectional view of a cigarette with a filter according to one embodiment of the present invention.

FIG. 3 is a schematic sectional view of a cigarette with a cigarette filter (filter-tipped cigarette) 20 according to one embodiment of the present invention. The filter-tipped cigarette 20 comprises a cigarette 22 comprising a tobacco filler 221, such as tobacco shreds, wrapped with a cigarette paper 222. The cigarette 22 is the same as a conventional cigarette. A filter 24 is attached to one end of the cigarette 22. The filter 24 comprises a filter section 241 containing the adsorbent of the present invention, provided in direct contact with the one end of the cigarette 22. A plain filter section 242 may be provided at that end of the filter section 241 on the downstream side with respect to the direction of the flow of mainstream smoke.

The filter section 241 containing the adsorbent comprising for example, cellulose acetate fibers 241a, in which adsorbent particles AAP according to the present invention dispersed therein, wrapped with a filter wrapper paper 241b, and may be similar to a conventional charcoal filter except that the adsorbent of the present invention is used in place of charcoal (activated carbon).

The plain filter section 242 may be formed of, for example, a tow of cellulose acetate fibers 242a wrapped with a filter wrapper paper 242b. Substantially no adsorbent capable of adsorbing mainstream smoke gas components is contained in the plain filter section 242.

The filter 24 composed of the filter sections 241 and 242 is fitted to the cigarette 22 by means of a tipping paper 26.

FIG. 4 is a schematic sectional view of a cigarette with a cigarette filter (filter-tipped cigarette) 30 according to another embodiment of the present invention. In this filter-tipped cigarette 30, a filter 32 fitted to the cigarette 22 by means of the tipping paper 26 comprises a first plain filter section 321 directly fitted to one end of the cigarette 22 and a second plain filter section 322 provided spaced apart from the first plain filter section 321. These sections are wholly wrapped with a filter wrapper paper 36. The first plain filter section 321 and second plain filter section 322 may be comprised of, for example, tows of cellulose acetate fiber 321a and 322a, respectively. The space (cavity) 34 between the first plain filter section 321 and the second plain filter section 322 is filled with the adsorbent particles AAP according to the present invention.

In the filter-tipped cigarette of the present invention, the cigarette mainstream smoke component adsorbent according to the present invention has its activated carbon covered by a highly airtight glucan film when the cigarette is not smoked (for example, during storage), so that the adsorption of flavorant contained in the cigarette, etc. can be suppressed. Accordingly, the total amount of deliverable flavorant components contained in the cigarette is not decreased before smoking, so that the flavor can be delivered at a relatively high proportion into the mainstream smoke. When the adsorbent is brought into contact with tobacco mainstream smoke generated by, e.g., repeated smoking actions, the glucan film is for the first time partially dissolved and detached mainly by highly polar components (moisture, etc.) contained in the tobacco mainstream smoke, so that the inherent adsorptive function of the activated carbon can be exerted, thereby attaining the adsorption of gas components contained in the cigarette mainstream smoke.

EXAMPLES

The present invention will be described by way of Examples below. Needless to say, the present invention is not limited by these Examples.

Example 1

A 5% by weight concentration aqueous pullulan dispersion was prepared. Activated carbon of 250 μm average particle diameter (palm husk activated carbon employed in conventional charcoal filters; specific surface area: 1000 m²/g), 15 kg, was placed in a tumbling fluidized-bed granulation drier (Model SFC-15 manufactured by Freund International Ltd.). The agitation blade was rotated at about 200 rpm, and hot air of 70 to 80° C. was blown into the drier at a flow rate of 1.0 to 2.0 m/sec, thereby forming a fluidized bed of the activated carbon particles. While maintaining the fluidized bed by continuous agitation, the aqueous pullulan dispersion was sprayed thereinto at 130 to 150 g/min. Thus, the aqueous pullulan dispersion, 15 kg in total, was sprayed onto the surfaces of the activated carbon particles, and dried. Thereafter, the activated carbon particles were dried by hot air of 50 to 70° C. for 3 to 5 minutes, thereby obtaining 14.7 kg of desired adsorbent. With respect to the obtained adsorbent, the amount of pullulan applied on the surfaces of the activated carbon was quantitatively determined to find that the adsorbent had a 4.5% by weight pullulan film.

Example 2

A 5% by weight concentration aqueous pullulan dispersion was prepared. The same palm husk activated carbon as used in Example 1, 5 kg, was placed in a fluidized-bed granulation drier (Model MGD-05 manufactured by Okawara Mfg. Co., Ltd.). While rotating the agitation blade at about 20 rpm in order to assist the initial fluidization, hot air of 75° C. was blown into the drier at a flow rate of 0.6 m/sec, thereby forming a fluidized bed of the activated carbon particles. Intermittent spraying comprising spraying the aqueous pullulan dispersion at a rate of 65 g/min for one minute and stopping the spraying for three minutes was repeated on the fluidized bed. Thus, the aqueous pullulan dispersion, 2 kg in total, was sprayed onto the surfaces of the activated carbon particles, and dried. Immediately thereafter, the temperature of the hot air was lowered to room temperature and the air was blown at a flow rate of 0.4 m/sec to conduct cooling. Thus, a desired adsorbent was obtained.

Example 3

A 10% by weight concentration aqueous hydroxypropylmethylcellulose dispersion was prepared. The same palm husk activated carbon as used in Example 1, 150 g, was placed in a fluidized-bed granulation drier (Model GB-22 manufactured by Yamato Scientific Co., Ltd.). While rotating the agitation blade at about 20 rpm, hot air of 80° C. was blown into the drier at a flow rate of 0.6 m/sec, thereby forming a fluidized bed of the activated carbon particles. By continuously spraying the aqueous hydroxypropylmethylcellulose dispersion on the fluidized bed, the aqueous hydroxypropylmethylcellulose dispersion, 15 g in total, was applied onto the surfaces of the activated carbon particles, and dried. Immediately thereafter, the temperature of the hot air was lowered to room temperature and the air was blown at a flow rate of 0.4 m/sec to conduct cooling. Thus, a desired adsorbent was obtained.

Example 4

An aqueous glucan dispersion of 5% by weight pullulan concentration, 5% by weight gelatin concentration and 1% by weight carboxymethylcellulose concentration was prepared. The same palm husk activated carbon as used in Example 1, 150 g, was placed in a tumbling fluidized-bed granulator. The rotating perforated plate disposed at the bottom was rotated at about 300 rpm, and the agitation blade for preventing granulation was rotated at about 320 rpm. Hot air of 75° C. was blown into the granulator at a flow rate of 0.6 m/sec, thereby forming a fluidized bed of the activated carbon particles. By continuously spraying the above aqueous glucan dispersion held at 50° C. on the fluidized bed, an aqueous glucan dispersion, 15 g in total, was applied onto the surfaces of the activated carbon particles, and dried. Immediately thereafter, the temperature of the hot air was lowered to room temperature, and the air was blown at a flow rate of 0.4 m/sec to thereby conduct cooling. Thus, a desired adsorbent was obtained.

Example 5

An adsorbent-containing cellulose acetate filter was produced using each of the adsorbents obtained in Examples 1 to 4 in accordance with the routine procedure for production of charcoal filters. A filter-tipped cigarette shown in FIG. 3 was produced using each of the obtained filters. The maximum amount of adsorbent added to the adsorbent-containing filter section 241 was 80 mg per 10 mm filter length. With respect to the cigarettes, no marked decreases of the flavor components of leaf tobacco and the fragrance of the secondary flavorant during the storage were observed. However, when each of the cigarettes was smoked, a mild flavor smoking taste peculiar to cigarettes with a charcoal filter could be enjoyed.

Example 6

A

A glass tube was charged with 20 mg of the adsorbent obtained in Example 1. At 25° C., vaporized linalool, saturated steam and gaseous nitrogen were simultaneously passed through the interior of the glass tube at respective flow rates of 240 cc/min, 480 cc/min and 80 cc/min for four hours. Thereafter, the amount of linalool adsorbed on the adsorbent was determined.

The same quantitative determination of linalool was carried out using the palm husk activated carbon (Comparative Example) used in the production of the adsorbent of Example 1 in place of the adsorbent obtained in Example 1.

B

A glass tube was charged with 20 mg of the adsorbent obtained in Example 1. At 25° C., saturated steam was passed through the interior of the glass tube for 0.5 hour in order to ensure the exertion of the adsorptive function of the adsorbent. Thereafter, in the same manner as in (A) above, linalool, saturated steam and gaseous nitrogen were passed through the interior of the glass tube, and the amount of linalool adsorbed on the adsorbent was determined.

The results are shown in FIG. 5. As is apparent from the results shown in FIG. 5, while the adsorbent of the present invention adsorbed only about 10% of the amount of linalool adsorbed on conventional activated carbon under the condition in which the glucan film is not dissolved ((A) above), the adsorbent of the present invention adsorbed about 90% of the amount of linalool adsorbed on conventional activated carbon under the condition in which the glucan film is dissolved ((B) above).

Example 7

Adsorbent-containing cellulose acetate filters were produced using 48 mg of the adsorbent of the present invention obtained in Example 1 and 40 mg of the conventional palm husk activated carbon used in Example 1, respectively, in accordance with the routine procedure for production of charcoal filters. The amount of activated carbon contained in 48 mg of the adsorbent of the present invention and 40 mg of the palm husk activated carbon are the same in the amount of activated carbon.

A filter-tipped cigarette shown in FIG. 3 was produced using each of the obtained filters. Menthol was added to each of these filter-tipped cigarettes in an amount of 1.3% by weight based on the amount of tobacco shreds.

The obtained filter-tipped cigarettes were stored in an atmosphere conditioned at 22° C. and a relative humidity of 60%. Each of the cigarettes was smoked by an automatic smoker one day after, seven days after, 20 days after and 57 days after the initiation of the storage, and the amount of menthol contained in mainstream smoke was determined by the routine procedure. The results are shown in FIG. 6. In FIG. 6, the line a indicates the results with respect to the filter-tipped cigarette containing the adsorbent of the present invention, and the line b the results with respect to the filter-tipped cigarette containing the conventional palm husk activated carbon.

It is apparent from the results shown in FIG. 6 that the filter-tipped cigarette containing the adsorbent of the present invention exhibits an increase of about 46% 7 days after the initiation of the storage, an increase of about 48% 20 days after the initiation of the storage and an increase of about 46% 57 days after the initiation of the storage in the amount of menthol contained in mainstream smoke over those of the filter-tipped cigarette containing the conventional activated carbon.

What is claimed:

1. A cigarette which contains a smoking substance having a flavorant and a cigarette filter, said cigarette filter comprising:
    a cigarette mainstream smoke component adsorbent which consists of:
        activated carbon particles having pores, the pores opening at a surface of the activated carbon particles, and
        an airtight and water-soluble pullulan film which covers the entire surface of the activated carbon particles without infiltrating the pores of the activated carbon particles, to thereby enclose said pores,
    the pullulan film being such that it suppresses adsorption of the flavorant contained in the smoking substance by the activated carbon prior to smoking, and it dissolves and detaches from the activated carbon when the cigarette filter is brought into contact with cigarette mainstream smoke generated from the cigarette due to the presence of moisture and other polar components, so that the adsorption function of the activated carbon can be exerted, thereby attaining the adsorption of gas components contained in the cigarette mainstream smoke.

2. The cigarette of claim 1, wherein the pullulan film contains a softening agent.

3. The cigarette of claim 1, wherein the pullulan film contains 0.1 to 3% by weight of a softening agent, based on the weight of the pullulan.

4. The cigarette of claim 1, wherein the pullulan film contains a colorant other than black colorants.

5. The cigarette of claim 1, wherein the pullulan film contains 0.1 to 1% by weight of a colorant other than black colorants, based on the weight of the pullulan.

6. The cigarette of claim 1, wherein the cigarette mainstream smoke component adsorbent contains 0.1 to 10% by weight of pullulan, based on the total weight of the adsorbent.

7. The cigarette of claim 1, wherein the cigarette mainstream smoke component adsorbent is dispersed in the filter material of the cigarette filter.

8. The cigarette of claim 1, wherein the filter consists of two filter sections provided spaced apart from each other, and the space between the two filter sections is filled with the cigarette mainstream smoke component adsorbent.

* * * * *